United States Patent [19]
Vandling, deceased et al.

[11] 4,370,563
[45] * Jan. 25, 1983

[54] METHOD OF AND APPARATUS FOR LOAD AND/OR LOAD CONTROL SIGNALING TO CUSTOMERS IN A POWER SYSTEM

[76] Inventors: John M. Vandling, deceased, late of Pleasantville, N.Y.; Patricia Vandling, executrix, Hoanjovo La., Pleasantville, N.Y. 10570

[ * ] Notice: The portion of the term of this patent subsequent to Jan. 20, 1998, has been disclaimed.

[21] Appl. No.: 219,985

[22] Filed: Dec. 24, 1980

Related U.S. Application Data

[63] Continuation-in-part of Ser. No. 856,757, Dec. 2, 1977, Pat. No. 4,246,492.

[51] Int. Cl.³ ............................................. H02J 13/00
[52] U.S. Cl. ..................................... 307/40; 307/129; 361/182; 375/48
[58] Field of Search ................ 307/40, 143, 511, 129, 307/29, 35, 149; 361/78, 182, 183; 340/171 R, 288, 310 A, 310 R; 364/493, 492; 375/45, 48

[56] References Cited

U.S. PATENT DOCUMENTS

| | | | |
|---|---|---|---|
| 3,558,911 | 1/1971 | Chen | 307/129 |
| 3,639,810 | 2/1972 | Schleif | 307/152 |
| 3,643,160 | 2/1972 | Ray et al. | 375/48 |
| 3,683,343 | 8/1972 | Feldman | 340/178 |
| 4,246,492 | 1/1981 | Vandling | 307/40 |

*Primary Examiner*—L. T. Hix
*Assistant Examiner*—S. D. Schreyer
*Attorney, Agent, or Firm*—Woodcock, Washburn, Kurtz, Mackiewicz & Norris

[57] ABSTRACT

Information is conveyed from a transmitting site to a consuming location in an electric power system by varying the frequency of the power from the nominal standard generating frequency. The signaled variation in frequency is detected at a power consuming location and a frequency indicating signal is generated. Frequency deviations of predetermined magnitude for a predetermined time duration signal a selected range of power system load while different deviations for different times signal automatic remote control of certain predetermined loads or other functions.

29 Claims, 13 Drawing Figures

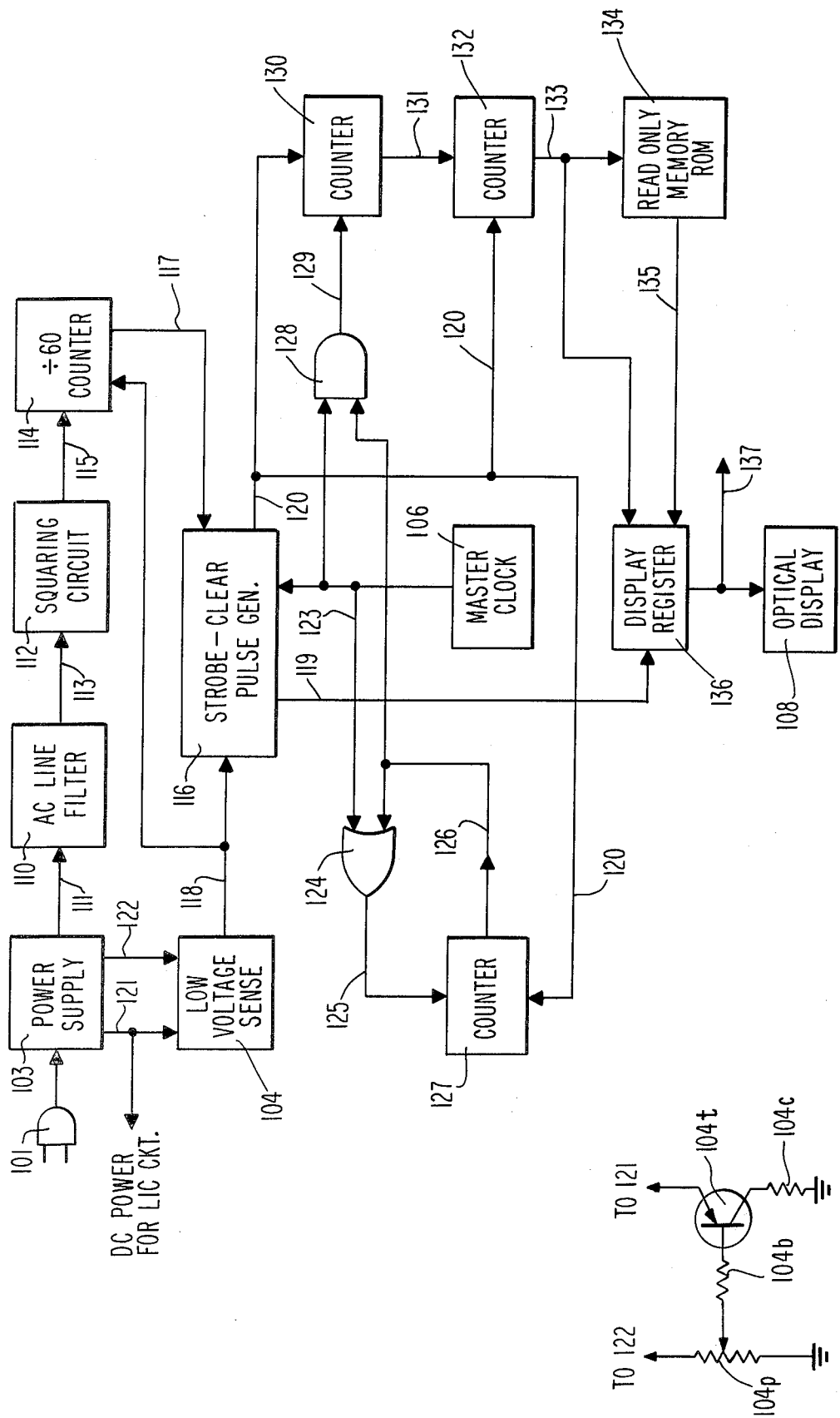

METHOD OF AND APPARATUS FOR LOAD AND/OR LOAD CONTROL SIGNALING TO CUSTOMERS IN A POWER SYSTEM

RELATED APPLICATION

This application is a continuation-in-part of application Ser. No. 856,757 filed Dec. 2, 1977 now U.S. Pat. No. 4,246,492.

BACKGROUND OF THE INVENTION

This invention relates to a method and apparatus for signaling a power consuming location of load conditions.

It is generally recognized that the electric power generating capacity is not, at the present time, utilized efficiently. This inefficiency results from the fact that the load on the power generating system is not distributed evenly throughout a 24-hour day. There are peak periods in which the load is extremely heavy and the full capacity of the power generating system is demanded, and there are light periods in which there is an excess of power generating capacity. The result has been a power generating system which is often overloaded during peak periods of load and inefficient during light periods. This unbalanced condition has increased pressure to expand the power generating capacity to better handle the peak load periods with a resulting increase in inefficiency during the light periods.

In an effort to smooth out the peaks and valleys in power consumption, power companies encourage the reduction of optional load, e.g., residential air conditioners, during typical peak load periods. In some instances, the optional load has been removed from the system by means of a time clock.

U.S. Pat. No. 3,683,343—Feldman et al. discloses a system wherein signals are superimposed on the power lines so as to indicate loads in the system thereby providing the customer with an indication of the load. The superimposed signals are also utilized to determine the scale factor of a meter so as to provide the customer with a variation in electric rates depending upon the load condition on the power system.

Despite the above-mentioned efforts to achieve certain efficiency and economy in the power generating systems, there has been no wide-scale, consistent use of such techniques. The use of time clocks has been less than satisfactory since the load conditions at a certain time on one day may differ considerably from the load conditions at the same time on another day. Superimposing load condition signals on the power lines along with the power generating frequency has also met with little if no use. This may in part be attributable to the cost of installing the additional signaling equipment at the generating source. Such signaling equipment may also be less than desirable under circumstances where electrical noise erroneously indicates a change in load. Furthermore, superimposing a signal on the power lines might be fraudulently duplicated so as to permit the benefit of a reduced rate during a peak load period where varying metering rates are provided.

SUMMARY OF THE INVENTION

It is an object of this invention to provide a method of and apparatus for communicating information relating to load and/or load control between a power generating location and a power consuming location or power load controlling location without requiring carrier current or other superimposed signals.

It is a further object to provide a system readily available to any consuming or controlling locations without need for communication means other than the same electrical circuit by which power is delivered to the consuming location.

It is also an object of this invention to reduce the need to impose brownouts or blackouts as a means of reducing load in overload peak periods.

It is also an object of this invention to provide a method of and apparatus for communicating load and/or load control information which is substantially immune from electrical noise.

It is a further object of this invention to provide a method of and apparatus for communicating load and/or load control information which is substantially immune to fraud on the part of the utility and the consumer alike.

It is a still further object of this invention to provide an economic incentive to encourage power consumption during off-peak load periods.

In accordance with these and other objects of the invention, power is generated for the system at a nominal frequency at one or more power generating locations which may be connected to a common power grid and a load including a plurality of power consuming locations is changed periodically. The frequency of the power is varied from a nominal standard to signal load and/or load control information and the frequency of the power may be varied in a different manner to convey additional information without signaling load and/or load control information.

In further accordance with the objects of this invention, a variation in the frequency signaling load and/or load control information is detected at power consuming locations while variations in the frequency not signaling load and/or load control information are ignored. A load indicating signal is then generated at the power consuming location only in response to the detected variations signaling load and/or load control information.

In a particularly preferred embodiment of the invention, programming is provided such that the load indicating signal is responsive to a predetermined or programmed variation in frequency so as to signal predetermined load and/or load control information.

In accordance with one important aspect of the invention, low voltage sensing may be provided so as to sense a low-power voltage and to signal the low-power voltage. The low voltage signaling may in turn inhibit load signaling.

In accordance with another important aspect of the invention, a back-up may be provided so as to permit the load signaling to continue in an appropriate manner regardless of the power voltage or even in the absence of a power voltage at least for short periods of time.

In accordance with another important aspect of the invention, frequency variations within a predetermined frequency range and having a rate of change of frequency within a predetermined rate range are detected and a variation in frequency is validated only when the detected frequency lies within the predetermined frequency range and the rate of change of the detected frequency lies within the predetermined rate range. Further validation may be accomplished by detecting the duration of the frequency within the particular frequency range.

BRIEF DESCRIPTION OF THE DRAWINGS

FIG. 6 is a block diagram of the device shown in FIG. 5 with various frequency detection components shown in more detail;

FIG. 7 is a schematic diagram of the low voltage sensing circuit shown in FIGS. 5 and 6;

DETAILED DESCRIPTION OF THE PREFERRED EMBODIMENT

Figure 1:
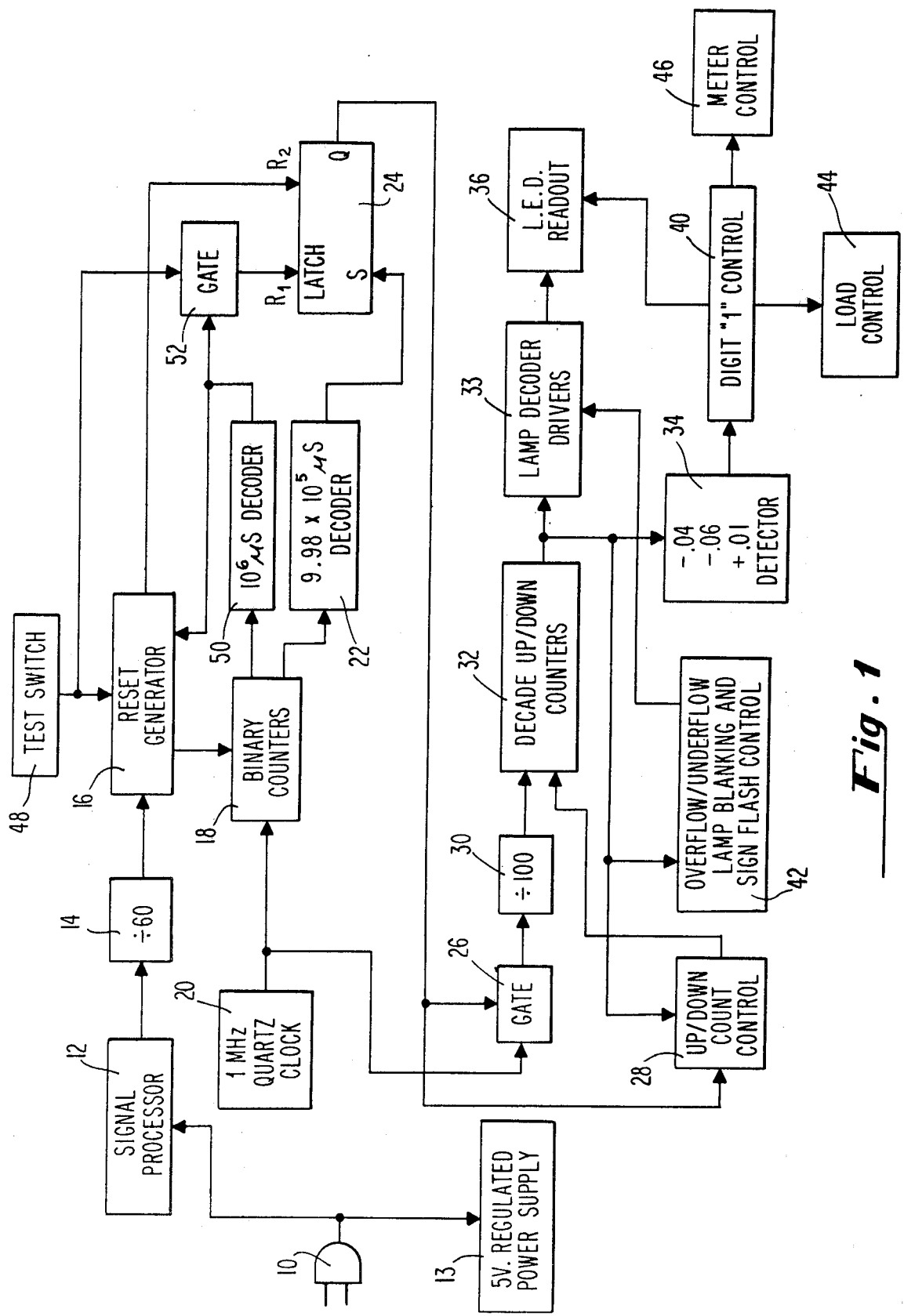
FIG. 1 is a block diagram of a preferred embodiment of the invention.

Referring to FIG. 1, apparatus is disclosed which is adapted to be connected to a power line at a power consuming location by means of a plug 10 for use in detecting the variations in generating frequency from a nominal standard which is indicative of a change in load conditions while ignoring changes or deviation in frequency from the nominal standard which are not indicative of changes in load conditions.

The power generating frequency at the plug 10 is applied to a signal processor 12 which amplitude limits and filters the generating frequency signal received. The output from the signal processor 12 comprises a pulse train having a frequency corresponding to the generating frequency which is then applied to a frequency divider 14 so as to generate an output pulse after a predetermined number of power generating cycles. In the preferred embodiment of the invention, the generating frequency is nominally 60.00 Hz. The frequency divider 14 divides by 60 so as to achieve a pulse for each 60 cycles of power. The pulses from the output of the frequency divider 14 are applied to a reset generator 16 which is utilized to generate output reset pulses which are applied to binary counters 18 so as to measure the frequency deviation or frequency change in the following way.

A source 20 of clock pulses at a frequency of 1 MHz. is applied to the binary counters 18 so as to provide an input to the counters of 1 microsecond clock pulses. Since the binary counters 18 will be reset in response to output reset pulses from the reset generator 16, the count accumulated in the counters 18 during 60 power cycles is indicative of the generating frequency.

In accordance with this invention, a decoder 22 is coupled to binary counters 18 which sets a latch 24 at input S which generates a control signal at output Q for a gate 26 and an up/down count control 28. In the preferred embodiment of the invention illustrated, the decoder 22 is responsive to a count of $9.98 \times 10^5$ clock pulses, i.e., the number of clock pulses accumulated in $9.98 \times 10^5$ microseconds. When this count is accumulated corresponding to just under one second has elapsed, the output Q of the latch 24 will open the gate 26 so as to allow clock pulses from the source 20 to flow through the gate 26. By providing a frequency divider 30 which divides by 100, the clock pulses flowing from the gate 26 once the latch 24 is set will, upon application to decade up/down counters 32, indicate a percentage of the actual power generating frequency. In this connection, the up/down count control 28 presets a count of 20 in the counters 32 and the clock pulses from the gate 26 divided by the divider 30 counts down to a count of zero after 2000 microseconds. The count of zero from the counters 32 is applied back to the up/down count control 28 so as to instruct the counters 32 to count up. The counters 32 will count down and subsequently count up until such time as an inhibit signal from the latch 24 inhibits the gate 26. This then indicates the end of a measuring cycle of the generating frequency and the accumulated count in the counters 32 accordingly indicates the percentage deviation of the generating frequency from 60.00 Hz. From the foregoing, it should be understood that one pulse will be presented to the counters 32 every 100 microseconds when gate 26 is open.

The output from the counters 32 is applied to a detector which detects the actual deviation from 60.00 Hz. More specifically, the detector 34 is adapted to detect deviations of $-0.04\%$, $-0.06\%$ and $+0.01\%$. As will be described subsequently, the detector 34 is capable of ignoring variations or deviations in the generating frequency closer to the nominal frequency, e.g., 60.00 Hz. For example, the detector 34 will not be responsive to frequency deviations of 0 to $-0.03\%$ before or after $-0.04\%$ has been detected. Rather, after detection of a $-0.04\%$ deviation, the detector will not indicate a change in load conditions until such time as the frequency changes to $+0.01\%$. Similarly, detection of a $-0.05\%$ deviation will not indicate a change in load conditions over those of $-0.04\%$ deviation. A $-0.06\%$ deviation will signal a new load condition which will only change upon reaching $-0.04\%$. The load condition represented by $-0.04\%$ will remain until frequency reaches $+0.01\%$. Thus, the detector 34 is capable of ignoring certain frequency deviations while detecting other deviations signaling load and/or load control information.

In order to indicate the load conditions, indicator means in the form of an LED readout 36 which is coupled to the counters 32 through lamp decoder drivers 38 are provided. In the preferred embodiment of the invention, the LED readout 36 is adapted to indicate a percentage of the actual frequency, e.g., $-0.03$ indicating a frequency variation of 0.03% below 60.00 Hz. The LED readout includes a digit "1" in addition to the numerical frequency variation which is responsive to a digit "1" control 40 coupled to the output of the detector 34. In the preferred embodiment of the invention, the digit "1" will flash when a load and/or load control signal indicating a deviation of −0.04% is detected by the detector 34. The digit "1" will continue to flash until such time as a signal deviation of −0.06% is detected or a signal deviation of +0.01% is detected. When a −0.06 is detected, the digit "1" stops flashing and lights continuously at the LED readout 36. When a +0.01% deviation is detected at the detector 34, the digit "1" ceases to light at the LED readout 36.

It will of course be appreciated that the system as described in the foregoing is only capable of providing a frequency deviation readout where the frequency deviation does not exceed ±0.2% of 60.00 Hz., i.e., the frequency does not fall below 59.88 Hz. nor go above 60.12 Hz. In this connection, an overflow/underflow lamp blanking and sign flash control 42 is provided which blanks the numerical readout by controlling the lamp decoder drivers 38 and causes the appropriate plus or minus sign of the LED readout 36 to flash.

In accordance with another important aspect of the invention, the digit "1" control 40 may be coupled to a load control 44 so as to actually control the load. This would permit a customer at the power consuming location to automatically reduce or increase his load in response to the load condition signal without intervening himself. The digit "1" control 40 may also be coupled to a meter control 46 so as to permit the automatic adjustment of the metered rate. In other words, the customer could continue to consume power but the cost per KHW would be adjusted to reflect the more or less expensive cost of generating a unit of power under different load conditions.

As described above, the latch 24 is reset at input R2 in response to output pulses from the reset generator 16 which occur once every 60 cycles of the generating frequency. In order to provide for the testing of the gate and counter circuitry, a test switch 48 is associated with the reset generator 16 which inhibits the output from the frequency divider 14 and, by means of a $10^6$ microsecond decoder 50 produces reset pulses which are applied to reset input R1 through a gate 52 at an interval of $10^6$ microseconds which corresponds exactly to the interval of 60 cycles of the power generated frequency when operating precisely at the nominal rate of 60.00 Hz. The power from the plug 10 is also applied to a 5 volt regulated power supply 13 which provides a regulated supply to the various components of the apparatus through connections not depicted in FIG. 1.

Figure 2:
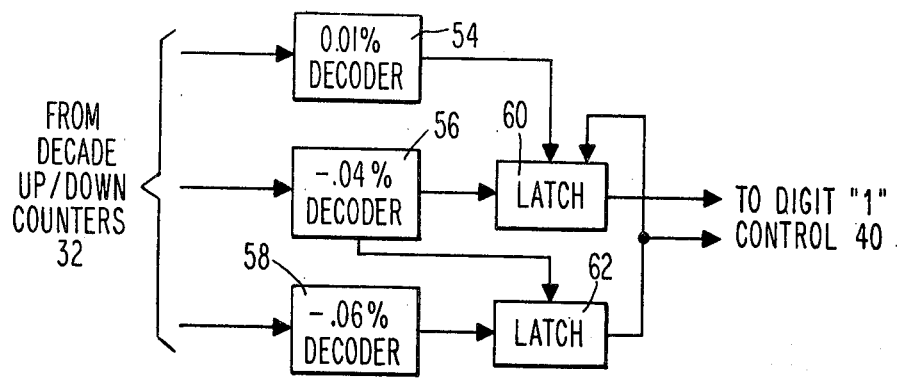
FIG. 2 is a block diagram of the detector shown in FIG. 1.

In accordance with this invention, it is very important to only detect variations or deviations in frequency which are intended to indicate load conditions or a change in load conditions which function is performed by the detector 34. Reference will now be made to FIG. 2 wherein a detector capable of this function is described in detail.

As shown in FIG. 2, detector 34 comprises decoders 54, 56 and 58 which are associated with the counters 32. More specifically, the decoder 54 is coupled to the counters 32 so as to be responsive to a count corresponding to a 60.00 Hz. frequency deviation of +0.01%. Similarly, the decoders 56 and 58 are coupled to the counters 18 so as to be responsive to deviations of −0.04% and −0.06% respectively. Latches 60 and 62 are associated with the decoders 56 and 58 respectively. Until such time as the decoder 56 detects a deviation of −0.04%, the latch 60 will not be set so as to provide the digit "1" control 40 with a signal which would initiate a flashing "1" output at the LED readout 36. After the latch 60 is set, it will only be reset when the decoder 54 produces an output so as to indicate a deviation of +0.01%, or the decoder 58 produces an output so as to indicate a deviation of −0.06%. After a −0.06% deviation has been detected, the latch 62 which produces a continuously lighted "1" at the readout 36 in response to the digit "1" control 40 will only be reset when a deviation no greater than −0.04% has been detected by the decoder 56.

Figure 3:
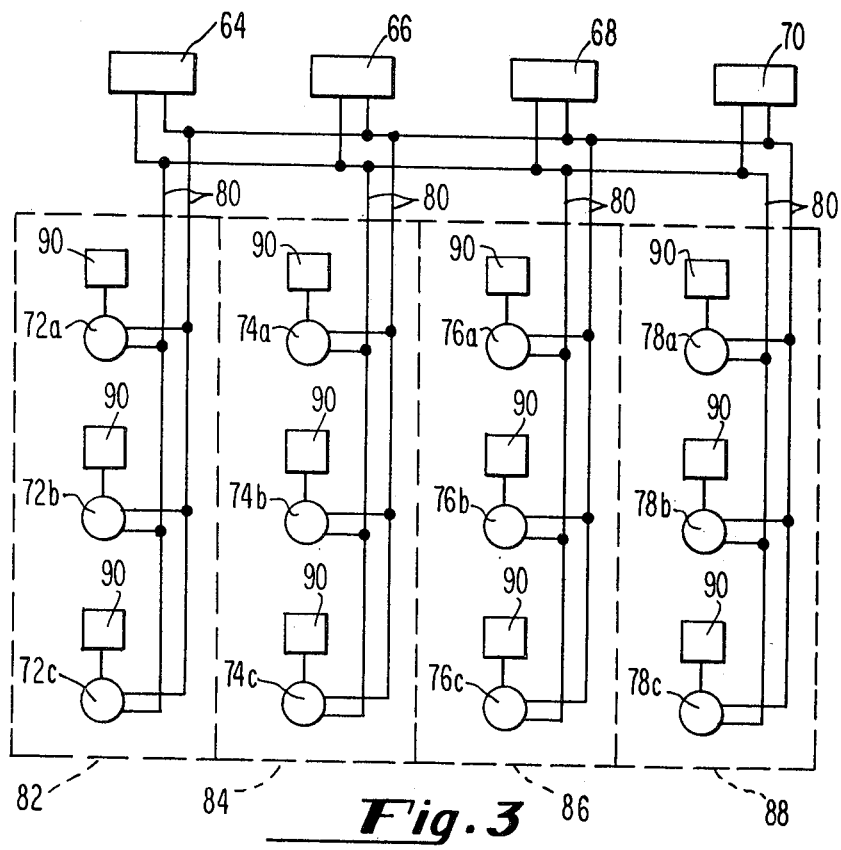
FIG. 3 is a block diagram of a power system including generating sources and loads which extends across a plurality of time zones and incorporates this invention for controlling the loads in those time zones.

In the United States, a power grid may extend across a number of different time or load zones and it may be desirable to signal power consuming locations in one zone to take one course of action at one time and power consuming locations in another zone to take another course of action at another time. As shown in FIG. 3, a power grid comprising power generating sources 64, 66, 68 and 70 are serving a plurality of power consuming locations 72a-c, 74a-c, 76a-c and 78a-c, all of which are connected by lines 80 in four different time zones 82, 84, 86 and 88.

In order to detect signaled load conditions by the generating sources 64, 66, 68 and 70, each of the power consuming locations 72a-c, 74(a-c), 76(a-c) and 78(a-c) includes apparatus 90 of the type shown in FIGS. 1 and 2 so as to detect the load conditions being signaled. However, in order to achieve phased loading of the system or phased changes in metering rates, the apparatus 90 in the various zones 83, 84, 86 and 88 are provided with a capacity to detect load condition signals only during predetermined time frames. For example, the apparatus 90 associated with the power consuming locations 72(a-c) in the zone 82 could detect load condition signals in the first 15 minutes after the hour and are inhibited the remainder of the hour. Similarly, the apparatus 90 in the next time zone 84 may detect load condition signals in the second 15 minutes after the hour and are inhibited the remainder of the hour.

Figure 4:
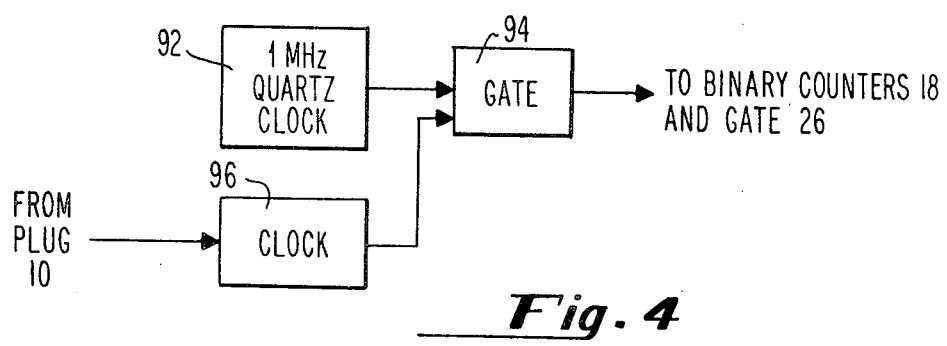
FIG. 4 is a block diagram of a source of clock pulses which may be employed in the apparatus of FIG. 1 for use in the system of FIG. 3.

FIG. 4 discloses a modification in the circuit of FIG. 1 which may be utilized to achieve the phased load condition detection illustrated in FIG. 3. In particular, FIG. 4 discloses circuitry which would be utilized to replace the clock pulse source 20 shown in FIG. 1. As shown in FIG. 4, a 1 MHz. quartz clock 92 is applied to a gate 94 which is enabled by a time of day clock 96 driven by accurate means such as the clock 92. The output from the gate 94 which is enabled at the appropriate segment of the hour the clock 96 is applied to the counters 18 and the gate 26.

The apparatus described in the foregoing is designed to operate with a 60.00 Hz. generating frequency presumably at a voltage of 100 to 125 volts. The detected generating frequency deviation is limited to 60.00 Hz. plus or minus 0.2% or 59.88 to 60.12 Hz. Furthermore, the apparatus is adapted to indicate a moderate loading condition with a −0.04% deviation or 59.94 Hz. and a heavy load condition at a −0.06% deviation or 59.94 Hz. It will of course be appreciated that the specific frequency choices of deviation have been arbitrarily chosen and other frequencies and deviations may be utilized to indicate the load and/or load control information. Moreover, it is possible to rely upon a rate of change of frequency rather than the actual frequency itself to indicate load and/or load control information. Accordingly, the use of the word change, variation or deviation in describing the invention herein and in the claims is intended to embrace changes in frequency as well as rates of change in frequency for signaling purposes or any suitable combination thereof.

Figure 5:
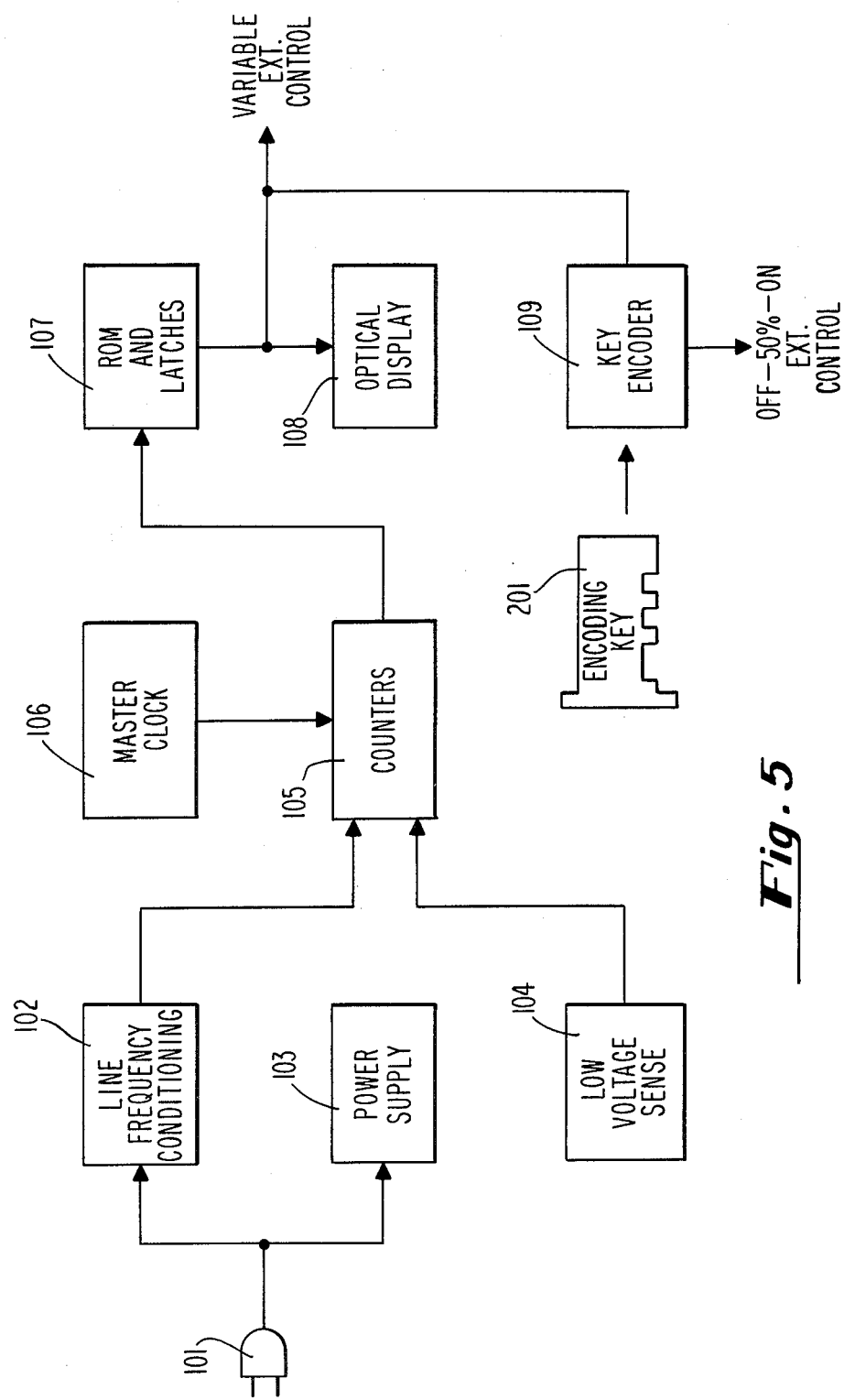
FIG. 5 is a block diagram of a load indicating and control device representing another embodiment in the invention.

Referring now to FIG. 5, a dual purpose load control and indicating device ("LIC") representing another embodiment of the invention will be described in detail. A single connection to the electric utility by a line 101, provides operating power for the circuitry from an internal low voltage power supply 103. Circuitry within the box 102, filters the line frequency to remove undesirable noise and other common disturbances and in turn provides appropriate digital pulses to various digital counters 105. A master quartz crystal clock 106, serves as the internal time base for accurate line frequency determination.

The LIC operating parameters are held in a read only memory (ROM) 107 while temporary data is held in latches or in counters which in turn provide frequency pattern indicating signals for variable external control as well as control of an LIC optical display 108 and a programmable key code translation circuitry or encoder 109. The key encoder 109, in accordance with one important aspect of the invention, is programmable by a key 201 so as to determine which optical character control signals will initiate load control commands.

With reference to FIG. 6, a more detailed development of the frequency detection portion of the circuit operation will now be described. The power supply 103 receives AC power from a normal utility plug connection 101, which of course may also be direct wired to any convenient point in the utility system. The power supply 103, develops three low level output voltages on the lines 111, 121 and 122. The line 111, is a low level sinewave signal representative of the power input signal on the line 101. A regulated and filtered DC voltage is available on the line 121 to operate all circuit elements and also to serve as a stable reference for the low voltage sensing circuit 104. The third power supply output voltage 122, is a partially filtered DC voltage which is representative of the average value of the power line voltage on the line 101.

The voltage regulator of the power supply 103, requires a certain minimum AC line voltage to insure reliable operation of regulator circuitry as well as other digital elements of the LIC circuitry which are powered by the voltage 121. The low voltage sensing circuit 104, is in accordance with another important aspect of the invention, set to compare the voltage 122, with the reference voltage 121, and determines an unsatisfactory line voltage before the regulated voltage 121 fails. This advance warning of possible failure of the voltage 121 develops a disable signal on the line 118, which inhibits appropriate circuitry such that erroneous data is not displayed or presented to externally controlled circuitry. An AC line filter 110, receives a low level line frequency indicative signal on the line 111, and processes this signal through a relatively high Q bandpass filter to remove undesirable disturbances such as SCR noise, carrier current signals and brief interruptions in continuity of the AC power on line 101.

A squaring circuit 112, consisting of an AC coupled comparator and integrator which in turn produces a short duration digital pulse for each sinewave cycle of the filtered signal at output 113. Digital pulses at output 115 are used to clock a dividing counter 114 such that a short duration pulse at an output 117 is produced for each 60 cycles of power line frequency counted by divider 114. In the case of a 60 hertz power line frequency, the pulses at the output 117, are evenly spaced at substantially one second intervals. Short term frequency variations due to switching transients or phase jitter etc. are effectively cancelled by the averaging action of the divider 114. In accordance with another important aspect of the invention, the high Q ringing effect of the filter 110 will continue to supply clock pulses at the output 115, even in the total absence of AC power for short durations of for example 40 milliseconds or less.

A pulse generator 116 produces a short duration non-overlapping pulse pair for each 60 line cycles counted by the divider 114. The first pulse of the pair on the strobe pulse output 119 is synchronized with the next clock pulse on the line 123 upon completion of the count of 60 line cycles as signaled by the pulse at the output 117. The second pulse of the pair is synchronized with the third clock pulse at the output 123, and appears as a clear pulse on the line 120. The strobe and clear pulses at outputs 119 and 120 respectively are each one clock period wide and separated by one clock period. The pulses at the outputs 119 and 120 are used to transfer data at strobe time from counters into temporary storage before clearing the counters just prior to the end of each period of 60 line cycles counted.

In accordance with this invention, the low voltage sensing circuit 104 as shown in FIG. 7 consists of a PNP transistor 104t with its emitter connected to the regulated reference voltage 121, and its base connected through a resistor 104b to the arm of a potentiometer 104p. One end of the potentiometer 104p is grounded and the opposite end is connected to the unregulated voltage 122. The transistor collector is connected to ground through a second resistor 104c. When the line voltage drops to a predetermined level for a predetermined time, the voltage at the arm of the potentiometer 104p drops to a level where insufficient base current in the transistor causes a loss of conduction which in turn causes the collector voltage to drop from a logic level 1 to a level 0. This level is present on the line 118 which causes the pulse generator 116 to issue a clear pulse on the line 120, and also causes the divider 114 to reset and restart a count of 60 when the line voltage returns to an acceptable level.

A master clock 106, consisting of a quartz crystal oscillator, provides precision 0.5 uSec. clock pulses on the line 123. The pulses 123, are applied to a counter 127 through gate 124. The counter 127 is arranged to latch and hold a logic 1 state on the line 126 after a predetermined number of clock pulses on the line 123 has been counted by the counter 127. This predetermined number corresponds to a period of time equal to 998,250 uSec. When the counter 127 latches, the line 126 enables the gate 128, which in turn presents clock pulses on the line 123 to the clock input 129 of a counter 130. The counter 130 is arranged to count 100 clock pulses 123, which is equal to a period of 50 uSec. The counter 130, then produces a short duration pulse on the line 131. This pulse also internally resets and restarts the counter 130, for a new period of 50 uSec. The first pulse on the line 131, is thus 998,300 uSec. (998,250+50 uSec.) after the clear pulse on the line 120. The second pulse on line 131 is 998,350 uSec. etc. Generation of pulses on the line 131, continues until 60 cycles have been counted. The counters 127, 130 and 132 are then cleared by a pulse on line 120, and a new period of 998,250 uSec. is started for the counter 127.

Figure 8:
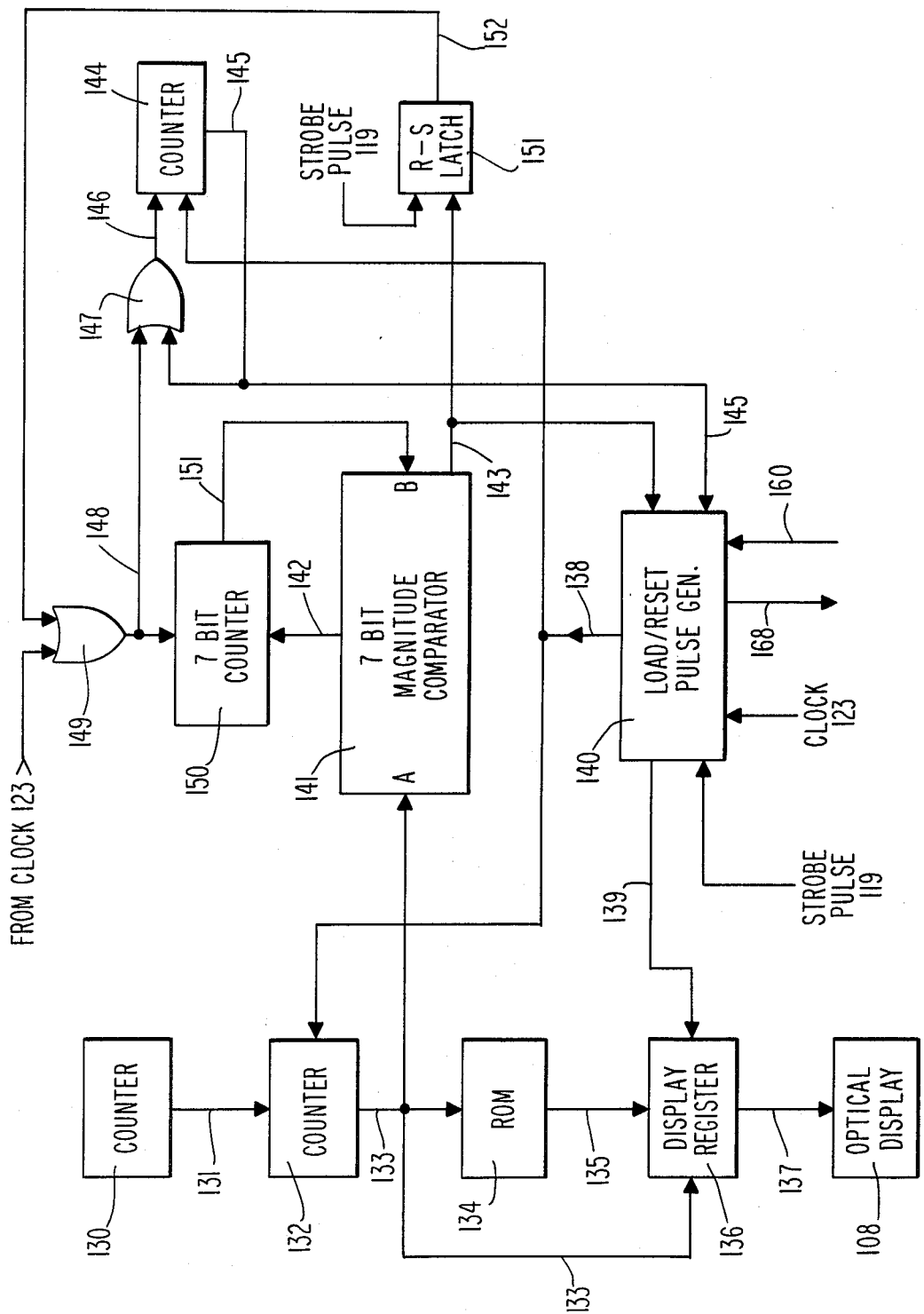
FIG. 8 is a block diagram showing expanded details of the frequency detection circuit shown in FIG. 6.

The counter 132, has its clock input connected to the line 131, and its clear input connected to the clear line 120, thus allowing a count to accumulate in the counter 132, which represents the number of pulses on the line 131, associated with each 60 line cycles counted by the divider 114. The clear pulse input of counter 132 is shown in FIG. 6, for the sake of clarification, as receiving a clear signal on the line 120. FIG. 8 shows the clear function of counter 132 with greater specificity. The state of the counter 132 is presented as 7 data bits on the line 133, and is representative of the power line 101 frequency as averaged over the period of 60 line cycles. A clock period of 50 uSec. for the counter 132 thus provides a line frequency measuring resolution of 0.005% (50/10$^6$) with the highest line frequency detectable of 60+0.175% which occurs at the moment the counter 127 latches and the line 126 enables the gate 128. Otherwise stated, the first pulse 131 represents a quartz timed period of 998,300 uSec. which is 0.17% less than one second.

When 60 line cycles are counted in a period of 998,300 uSec., the average line 101 frequency is 0.17% fast. For this example the data on the line 133, 01 HEX, indicates a frequency at least 0.17% but not less than 0.165% fast. Data on the line 133, of 02 HEX would indicate at least 0.165% but not less than 0.16% fast, etc. When the counter 132, reaches a count of 44 HEX (68 counts), the counter 132, latches and holds output data 133, at 44 HEX thus indicating a line 1, frequency of —0.165% or lower. Data on the line 133, thus represents frequency windows 0.005% wide starting at 60 Hertz +0.17% and ending at —0.165%. HEX data on the line 133, identifies 68 individual windows of 0.005% each. A 256-8 bit word read only memory (256×8 ROM) 134, is programmed to assign a specific code to the 4 least significant bits of the 8 bit word available on the data output of the ROM 134. These 4 bits are found on the line 135, and serve to select 16 of the 18 optical display characters used. The remaining two characters, H and L, when used, will be activated by overflow or underflow data on the line 133.

The display register 136 receives data from the lines 133 and 135 as the counter 132 is being clocked by the pulses 131, and thus is changing too rapidly for display purposes. The data that is representative of line frequency is that data on the lines 133 and 135, just prior to generating a clear pulse on the line 120, at the end of a period of counting 60 line cycles. The display register 136 is updated with the new and valid data by action of a strobe pulse on line 119 in FIG. 6. It may thus be understood that the optical display and external circuit control information 137 is held constant during the 60 cycle counting period and is updated as necessary at the start of the first cycle in the new 60 cycle counting period. The updating action of the strobe pulse line 119 in FIG. 6 is simplified to help explain the display of line frequency windows by the optical display 108. Updating of the optical display actually requires that three frequency pattern conditions are satisfied before an updating command is sent to the display register 136. The register 136 loading command has thus been modified in FIG. 8, and is shown on the line 139. The seven segment optical display 108 receives 6 bits of data from the line 137, which is decoded by appropriate circuitry within the display box 108 arranged to drive one or all seven display segments required to form the digits 0 through 9 and the letters A C E F J L P U. The diaplay decoding function within the optical display 108 could also be performed by an 8 bit ROM using one data word for each of the 18 desired characters. Each of seven bits of the ROM data output would be connected to appropriate drivers and then to each of the seven segments of the display. ROM addressing would be from the data on the line 137.

The following is a table of frequency windows showing the use of various combinations of display characters to represent specific frequency windows:

TABLE A

| FREQUENCY | OPTICAL DISPLAY | | |
|---|---|---|---|
| % of 60 HZ | Option 1 | Option 2 | Option 3 |
| over +.155% | 0 | H | H |
| .15 | 0 | A | A |
| .14 | 0 | A | A |
| .13 | 0 | C | C |
| .12 | 0 | C | C |
| .11 | 0 | E | E |
| .10 | 0 | E | E |
| .09 | 1 | 0 | 1 |
| .08 | 1 | 0 | 1 |
| .07 | 2 | 1 | 2 |
| .06 | 2 | 1 | 2 |
| .05 | 3 | 2 | 3 |
| .04 | 3 | 2 | 3 |
| .03 | 4 | 3 | 4 |
| .02 | 4 | 3 | 4 |
| .01 | 4 | 4 | 5 |
| 0 | 4 | 4 | 5 |
| −.01 | 4 | 5 | 6 |
| −.02 | 4 | 5 | 6 |
| −.03 | 4 | 6 | 7 |
| −.04 | 4 | 6 | 7 |
| −.05 | 5 | 7 | 8 |
| −.06 | 5 | 7 | 8 |
| −.07 | 6 | 8 | 9 |
| −.08 | 6 | 8 | 9 |
| −.09 | 7 | 9 | F |
| −.10 | 7 | 9 | F |
| −.11 | 8 | F | J |
| −.12 | 8 | F | J |
| −.13 | 9 | P | P |
| −.14 | 9 | P | P |
| −.15 | 9 | U | U |
| −.16 | 9 | U | U |
| Over −.165% | L | L | L |

The rate of frequency change detection portion of the LIC device will now be developed with reference to FIG. 8. There are two differences in the use of signals between FIGS. 6 and 8. First, in FIG. 6, the display register 136, receives a loading command from the strobe pulse line 119, to update the optical display 108, just prior to the clear pulse on the line 120, at the end of a 60 cycle counting period. A more accurate description of this loading signal on the line 139, in FIG. 8, is developed hereinafter. The second difference is in regard to the clearing of counter 132 which will also be more clearly defined hereinafter.

An important aspect of this invention is to provide a means to differentiate between intentional changes in power line frequency which represent information to be transmitted and the normal pattern of frequency variations which do not represent information and/or commands to be transmitted. In addition to the assignment of specific frequency windows to indicate predetermined information and/or commands, this invention also contemplates a method and apparatus for detecting frequency rates of change. Use of this second variable allows the LIC device to ignore the relatively slow frequency change rates not intended to signal information and/or commands while responding to the higher intentional frequency change rates which then serves to validate detected frequencies and durations. A rate of change of 0.01% per second has been selected for this embodiment as the minimum acceptable rate of change to validate a detected frequency and update the display provided the duration requirement is also satisfied. The basic rate detection concept utilizes the relatively accurate time base of 60 line cycles to generate a one second sample rate for detecting a difference of at least two ROM 134 address counts 133 from the counter 132, which as earlier stated represents a line frequency difference of 0.005% for each count on the line 133. More specifically, the ROM 134 address 133 is presented to the A input of a 7 bit magnitude comparator 141, while the 7 bit output 151, of an up/down counter 150, is presented to the comparator 141 B input. The comparator 141, has two outputs 142 and 143 to signal the way in which the A and B data inputs 133 and 151 respectively differ. The output 142 provides a count up or count down command to the counter 150 such that the counter 150 counts down when the A data of the comparator is less than the B data and counts up when the A data is greater than but not equal to B data. When A=B, the counter 150, is inhibited with its output data 151 matching the data then present on the ROM address line 133. While the counter 150 is held inhibited, it serves as a storage register of frequency information while new frequency information is determined during the next period of 60 line cycles.

At strobe pulse 119 time, the new frequency information now present on the line 133 is valid and may be compared with the prior frequency information still present on the line 151 from the counter 150. Also at strobe pulse 119 time, the R-S latch 151 is set by strobe pulse 119, which in turn provides an enabling signal on the line 152, such that the gate 149 is re-enabled thus passing the clock pulses 123 to the clock input of the counter 150. The R-S latch 151 may not be set by the strobe pulse 119 if the comparator 141 indicates that the A data is still equal to the B data which in turn is signaled on the line 143, such that the latch 151 is held in a reset condition with no enable signal possible on the line 152.

When A≠B and starting at pulse 119 time, the counter 150 rapidly counts in a direction to cause its output data on line 151 to match the new data on line 133. When comparator output line 143 signals that A=B, the latch 151 is reset which inhibits the gate 149, and prevents clock pulses 123 from advancing counters 144 and 150. The counter 144 is arranged to count up one count for each count of the counter 150 such that the counter 144 accumulates the number of counts necessary to change the data on the line 151 to match the line 133. The number of counts in the counter 144 thus indicates the number of 0.005% increments of frequency change between the present frequency indicated on the line 133 and the prior frequency on the line 133.

As above stated, the requirement of a 0.01% frequency change per second requires that the counter 144 accumulate at least two counts during the one second rate of the possible enabling signal on the line 152. At two counts, the counter 144 latches due to the inhibiting action of the signal on line 145 on the gate 147, thus removing clock pulses on the counter 144 clock input line 146. The counter 144 remains in a latched condition until the reset pulse generator 140 issues a reset pulse on the line 138. The pulse generator 140 provides a nonoverlapping pulse pair such that the display register 136 is loaded with data on the line 133 and 135 by a load command on the line 139 before a reset pulse on the line 138 alters the data on the lines 133 and 135. Reset and load pulses 138 and 139, respectively, are synchronized with clock pulses 123 provided three conditions are satisfied. First, the line 145 from the counter 144 must signal that the counter 144 is latched. The second requirement is that the line 143 indicates that A=B. the third condition is that a valid duration signal is present on the line 160. The signals on lines 160 and 168 will be more fully examined below when the frequency duration circuitry is described. When all three required conditions are true, the pulse generator 140 first sends a load pulse on the line 139 and then a reset pulse on the line 138. If one or both of the last two above conditions is not true at the time of A=B, then no load pulse 139 is generated. The reset pulse 138 is still generated at the moment A=B as signaled on the line 143. The line 168 is a valid rate pulse which is one strobe pulse 119 wide and is generated each time the counter 144 signals on the line 145 that a frequency change of 0.01% per second or greater has just been detected. The third and final variable incorporated in this LIC embodiment is the element of time as it relates to the time duration of line frequency within a specific frequency window after having reached that window at the required rate of change of 0.01% per second or greater.

Table B is a table of possible time assignments as they relate to specific frequency windows:

TABLE B

| TIME DURATION ASSIGNMENT | |
|---|---|
| FREQUENCY WINDOWS | MINIMUM DURATION SECONDS |
| Over +.155% | 4 |
| .155 to .135 | 4 |
| .135 to .115 | 16 |
| .115 to .095 | 32 |
| .095 to .075 | 60 |
| .075 to .055 | 60 |
| .055 to .035 | 60 |
| .035 to .015 | 60 |
| .015 to −.015 | 60 |
| −.005 to −.025 | 32 |
| −.025 to −.045 | 20 |
| −.045 to −.065 | 16 |
| −.065 to −.085 | 12 |
| −.085 to −.105 | 8 |
| −.105 to −.125 | 8 |
| −.125 to −.145 | 4 |
| −.145 to −.165 | 4 |
| over −.165 | 4 |

The shorter required durations are shown at the limits of frequency deviation with the assumption that messages and/or control commands requiring full deviation have a higher priority and therefore should be executed in a shorter time period.

Figure 9:
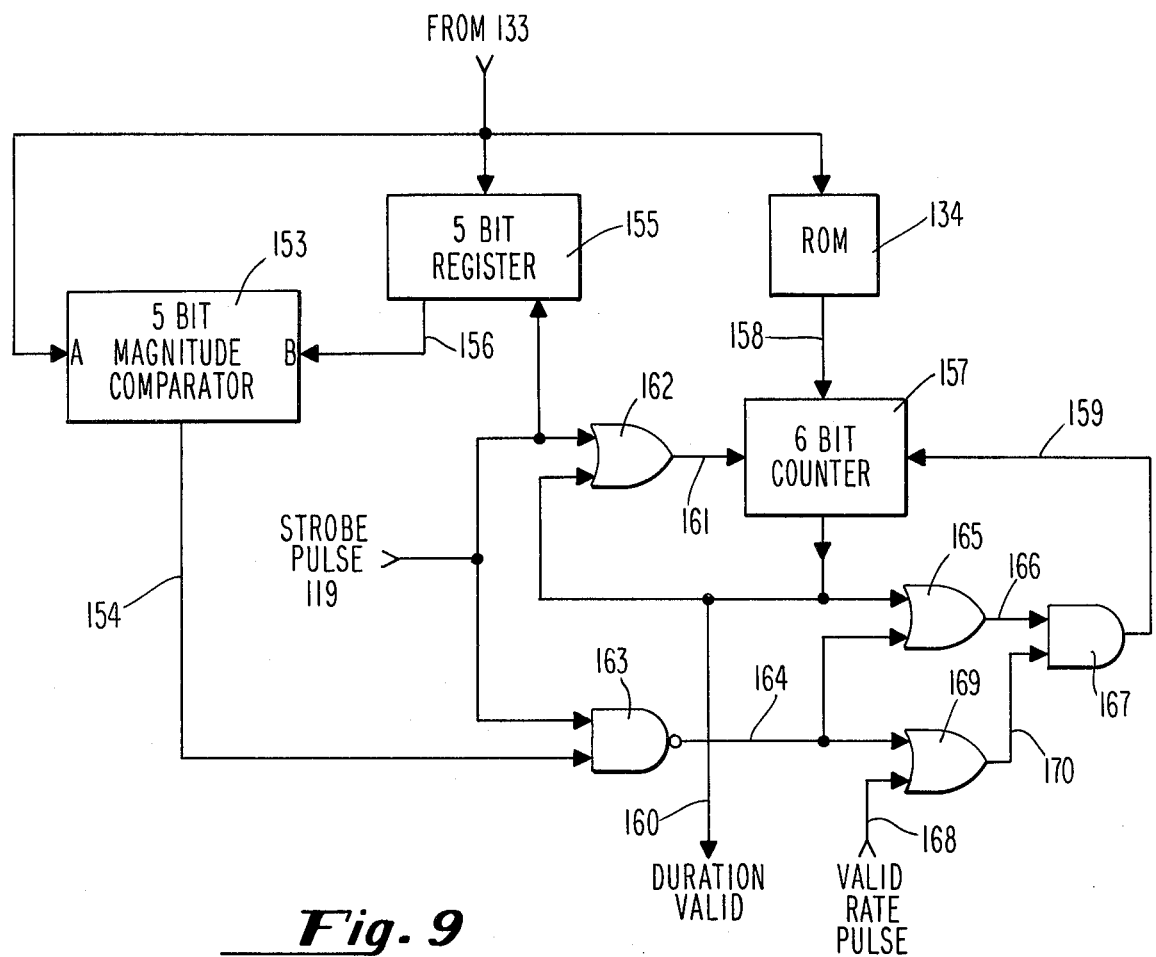
FIG. 9 is a block diagram of various components utilized in the frequency duration timing of the embodiments shown in FIGS. 5-8.

FIG. 9 indicates in block form, the elements of frequency duration timing. Frequency information present on the line 133 is loaded into the storage register 155 at strobe pulse 119 time. From the table B, it may be seen that 16 windows plus over and underflow have been assigned to the frequency deviation range of +0.155% to −0.165%. Each window represents 0.02% or four periods of 0.005% each. Each window thus spans four counts on the line 133. Since the window frequency resolution required for duration timing is ¼ the resolution available on the line 133, only the 5 most significant bits of available 7 are used by the register 155. The highest frequency window of interest which may be defined as having specific upper and lower edge frequencies is +0.15% and +0.14%. The +0.15% portion of the window is first identified at +0.155% and continues to +0.145% which is the upper edge of the +0.14% portion of the window and continues to the upper edge of the next lower full window at +0.135%. The upper edge of the first window at +0.155% is represented by the 4th pulse 131 from the counter 130. The register 155, advances one count for each four pulses 131 from the counter 130, thus at strobe pulse 119 time when the five bits of data presented to register 155 are valid, the register 155 is loaded by the trailing edge of the strobe pulse 119. At the rising edge of the next strobe pulse 119, gate 163 is enabled which in turn tests the line 154 of the magnitude comparator 153. During the strobe pulse 119 period the comparator 153 is presented with the previous window frequency data 156 on its B input and is also presented with the current valid frequency data 133 on its A input.

In comparator 153, A=B output is on the line 154. When A=B, the gate 163, is inhibited by the signal 154, which in turn prevents strobe pulses from reaching the line 164. When A≠B, the line 154 does not inhibit the gate 163 thus allowing the strobe pulse 119 to pass to the line 164, which in turn causes a pulse on line 166. Assuming no valid rate pulse 168 at this point in time, the pulse on line 166 is passed to the line 159, which in turn presets the data on ROM 134 output line 158 into the counter 157. The counter 157 is a six stage presettable device arranged to count down from the data loaded into the preset input from the line 158. The clock input 161 of counter 157 receives strobe pulses 119 at substantially a one second rate through gate 162 provided the duration valid signal 160 is not true. When the counter 157 counts down to zero, a signal on line 160 goes true which inhibits the gate 162, thus holding the counter 157 in a latched condition until the next load pulse 159 is generated. From the table B it may be seen that duration periods are in increments of four seconds, however, the counter 157 which is preset from the ROM 34, information to time the duration periods, is itself clocked at a one second rate on the line 161.

In order to have the four bit data word 158 preset four second increments into the counter 157 the first two least significant preset bits of counter 157 are held low, thus a zero data word 158, produces an immediate duration valid signal 160 at the time of a load pulse 159. When the data word 158 is 0001, the counter 157 must count four pulses 161 before reaching the zero state and latching a duration valid signal on the line 160.

The duration timing periods as listed in table B are intended as a typical example subject to modification. For this reason, a portion of the ROM 134 has been reserved for the purpose of time duration assignments and simple modification thereof. The data on the line 133 addresses a new 8 bit word in the ROM 134 for each 0.005% increment of frequency change, therefore making it necessary to program the ROM 134 with four identical 4 bit words 158 for each time duration assignment. The 4 bit word 158 is composed of the 4 most significant bits of each 8 bit word in the ROM 134. As above mentioned, the four least significant bits are assigned to display and load control. The valid rate pulse 168 is coincident with and available at strobe pulse 119 time provided the counter 144 has latched to indicate that the frequency during the previous second has changed at a rate of 0.01% or greater. This frequency change is detected by the comparator 153, only if the frequency has moved out of the window within which it was detected during the previous one second period. The duration valid signal 160, remains true even though the frequency changes at a valid rate as long as the frequency remains within the window such that comparator 153 continues to indicate that A=B on the line 154. When a duration valid condition has been achieved, the signal 160, will remain latched in a true state even though the frequency changes more than 0.02% which is sufficient to move it out of the window within which it resided for the required duration time to allow the duration valid signal to go to a true state, provided the rate of this frequency change has not reached the required 0.01% per second. Otherwise stated, the valid rate pulse 168 will re-load the duration time counter 157, only when duration valid is true and the frequency has changed enough to move out of its window thus providing the signal A≠B on the line 154. Otherwise, the counter 157 is loaded at strobe pulse 119 time when gate 163 is enabled by the line 154, indicating that comparator 153, A≠B and duration valid 160, not true.

In accordance with another important aspect of the invention, a relatively simple, reliable and inexpensive means is provided to allow untrained personnel to program the LIC device to perform one of a number of indication and/or control operations. It is intended that the LIC device once programmed, either in the manufacturing stage or by the end user, then becomes a unique element able to perform only the desired indicating and/or control function, i.e., the programming is irreversible. Although this programming step may be accomplished in various ways, for example, plugs, jumpers, mechanical switches, magnetic switches or optical sensing elements, the object of low cost and reliability is not satisfied by these more conventional methods.

The programming method chosen for this embodiment utilizes a flat non-conductive strip with a particular arrangement of teeth along one edge. The strip now resembles an ordinary toothed key thus the following will refer to it as an "encoding key". Eight teeth of the encoding key are arranged to provide two four bit words which in turn determine a particular pattern of frequency necessary to cause a change in load when the LIC device is connected for automatic control. The encoding key may have teeth arranged such that the encoding teeth are easily removed to allow a standard blank key to be programmed at some point after the manufacturing operation. For example, electric utilities or their designees may provide the appropriate key when the LIC device is to be installed and/or operated.

Figure 10:
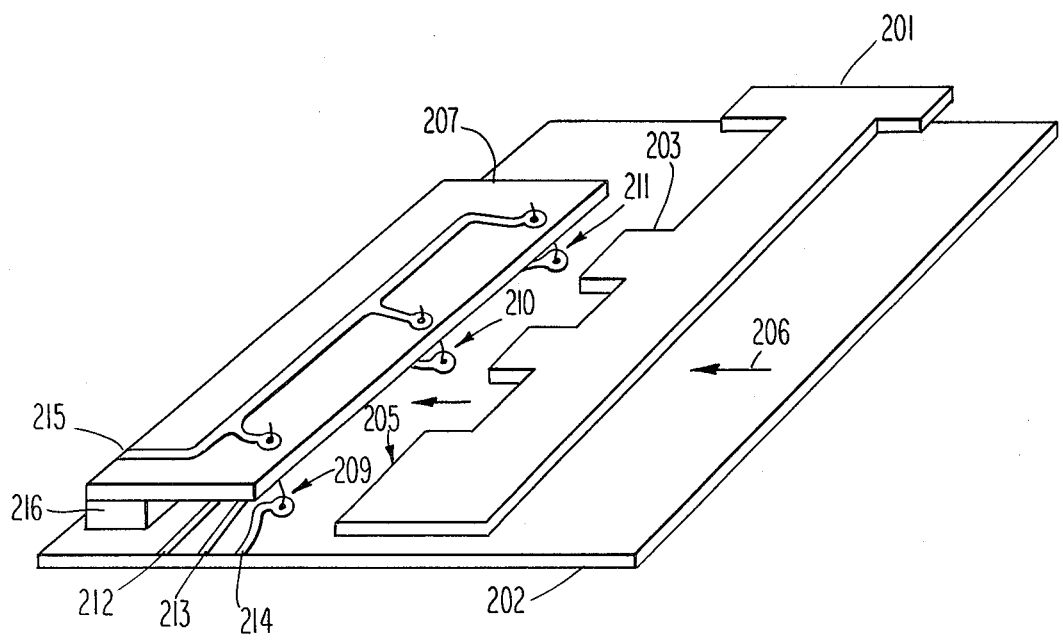
FIG. 10 is a schematic perspective view of a programming means for the embodiment shown in FIGS. 5-9.

FIG. 10 is a simplified sketch of the encoding key and associated tooth sensing elements. The encoding key is designed to be physically inserted into a mating slot in the LIC device such that the teeth line up with breakable conductive jumpers. In FIG. 10, the code key 201 is positioned such that its teeth 203, 204, 205 are opposite the fine wire jumpers 209, 210 and 211. When the key 201, is moved in the direction of the arrow 206, the jumpers 209, 210 and 211 are severed thus opening the circuit 215-214, 215-213 and 215-212. The breakable jumpers are permanently soldered to an appropriate circuit pattern on the printed circuit board 202. A second printed circuit board 207 is spaced from the main circuit board 202 and serves as the upper support for the breakable wire jumpers 209, 210 and 211. The spacer 216 between circuit boards 202 and 207 may be arranged with teeth which match and mesh with the location between teeth of the code key 201. It should be understood that the FIG. 10 sketch indicates only three teeth on the code key whereas the actual code key will have ten teeth. Eight teeth as above mentioned could be removable while the remaining two will not be easily removed. The purpose of teeth 209 and 211 is to provide a means to activate the LIC device only after the code key has been properly inserted. Certain encoding may require that all eight programming teeth are removed thus the circuit could not sense that a key has been inserted unless at least one additional tooth is incorporated to serve the activation function.

Figure 11:
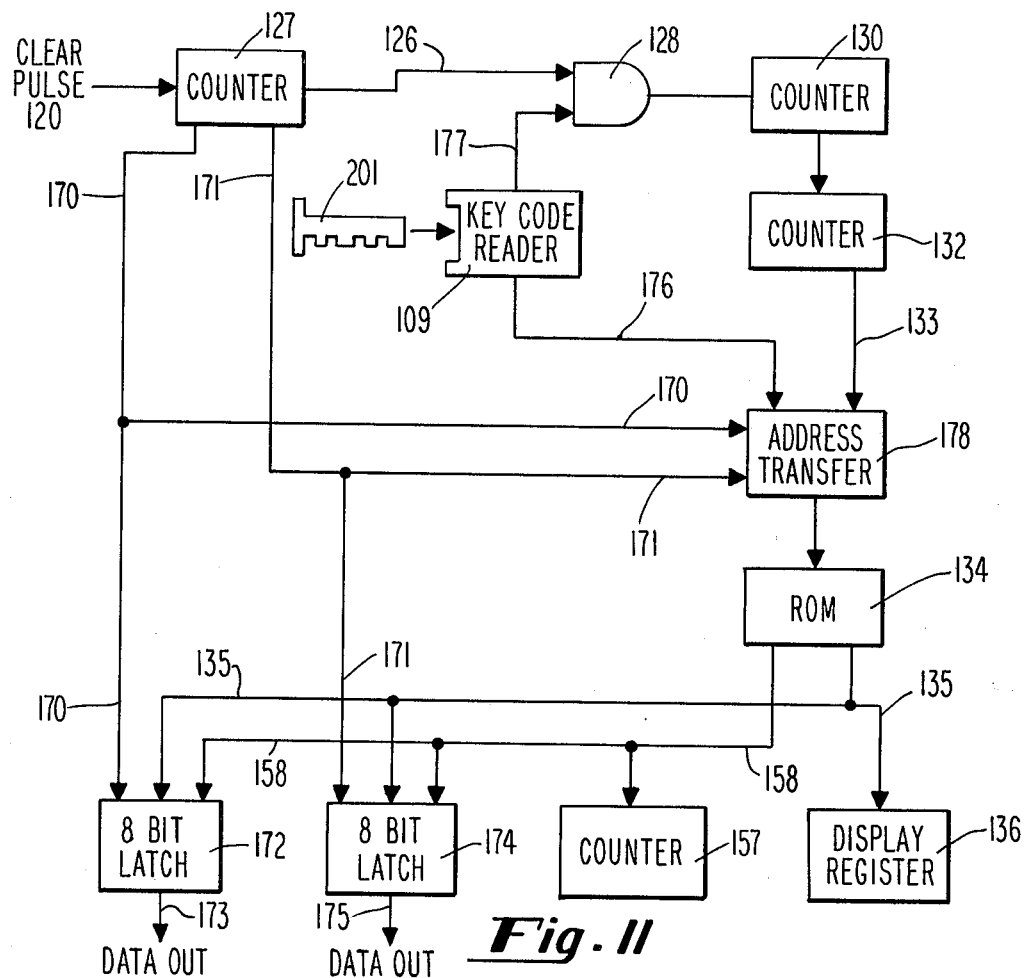
FIG. 11 is a block diagram circuitry utilized in combination with the programming means shown in FIG. 10.

FIG. 11 is a block diagram of the additional circuit elements required to transfer encoded information from the encoding key to the LIC circuits which will transpose the key code into one of the load control combinations for load reduction and another for load increase according to the Table C:

TABLE C

| LATCH 72 8 BIT HEX CODE | ENCODING KEY 8 BIT HEX CODE | DISPLAY REGISTER 4 BIT HEX CODE | EXTERNAL LOAD COMMAND |
|---|---|---|---|
| 89 | X0 | A-B-C-D-E-F | OFF |
| 9A | X1 | B-C-D-E-F | OFF |
| AB | X2 | C-D-E-F | OFF |
| BC | X3 | D-E-F | OFF |
| CD | X4 | E-F | OFF |
| 9B | X5 | A | 50% |
| 9B | X5 | B-C-D-E-F | OFF |
| AC | X6 | B | 50% |
| AC | X6 | C-D-E-F | OFF |
| BD | X7 | C | 50% |
| BD | X7 | D-E-F | OFF |
| CE | X8 | D | 50% |
| CE | X8 | E-F | OFF |
| 9C | X9 | A-B | 50% |
| 9C | X9 | C-D-E-F | OFF |
| AD | XA | B-C | 50% |
| AD | XA | D-E-F | OFF |
| BE | XB | C-D | 50% |
| BE | XB | E-F | OFF |
| 44 | XC | 0-1-2-3 | UNASSIGNED |
| 44 | XC | 4 | SPARE |
| 44 | XC | 5-6-7-8-9-A-B-C-D-E-F | CODES |
| 54 | XD | 5 | |
| 54 | XD | 4 | |
| 54 | XD | 0-1-2-3 | |
| 54 | XD | 6-7-8-9-A-B-C-D-E-F | |
| A5 | XE | A | |
| A5 | XE | 5 | |
| A5 | XE | 0-1-2-3-4 | |
| A5 | XE | B-C-D-E-F | |
| 0D | XF | D | |
| 0D | XF | E-F | |
| 6A | 0X | 9-8-7 | ON |
| 66 | 1X | 6 | ON |
| 55 | 2X | 5 | ON |
| 44 | 3X | 4 | ON |
| 33 | 4X | 3 | ON |
| 22 | 5X | 2 | ON |
| 11 | 6X | 1 | ON |
| A6 | 7X | 9-8-7 | 50% |
| A6 | 7X | 6-5-4-3-2-1 | ON |
| 75 | 8X | 6 | 50% |
| 75 | 8X | 5-4-3-2-1 | ON |
| 64 | 9X | 5 | 50% |
| 64 | 9X | 4-3-2-1 | ON |
| A5 | AX | 9-8-7-6 | 50% |
| A5 | AX | 5-4-3-2-1 | ON |
| A4 | BX | 9-8-7-6-5 | 50% |
| A4 | BX | 4-3-2-1 | ON |
| 04 | CX | 4 | UNASSIGNED |
| 04 | CX | 5-6-7-8-9-A-B-C-D-E-F | SPARE |
| 06 | DX | 6 | CODES |
| 06 | DX | 7-8-9-A-B-C-D-E-F | |
| 40 | EX | 4 | |
| 40 | EX | 5-6-7-8-9-A-B-C-D-E-F | |
| 60 | FX | 6 | |

TABLE C-continued

| LATCH 72 8 BIT HEX CODE | ENCODING KEY 8 BIT HEX CODE | DISPLAY REGISTER 4 BIT HEX CODE | EXTERNAL LOAD COMMAND |
|---|---|---|---|
| 60 | FX | 7-8-9-A-B-C-D-E-F | |
| XX | XX | OVERFLOW (L) | OFF |

Since the combinations listed in Table C are subject to modification, the code key transposition function is determined by information programmed into the LIC ROM 134. Each four bit word of the encoding key is intended to select one of the 16 possible combinations of load control. Each of the 16 combinations is defined by a separate 8 bit data word in the ROM 134, thus 16 ROM words are reserved for load reduction combinations and an additional 16 ROM words are reserved for load increase combinations.

When the encoding key is properly inserted in the key encoder 109, the line 177 removes an inhibit command from the gate 128, which activates the LIC device for normal operation. The two four bit words of the key code are presented on the line 176 to the ROM 134 through address transfer circuit 178. Normally the data 133 from the counter 132 serves as the ROM 134 address except for a brief period just prior to the counter 127 reaching a count of 998,250 uSec. The counter 127 is arranged to provide two short duration and non-coincident output pulses 170 and 171 at a point in time between the trailing edge of the clear pulse 120 and the enabling pulse for the gate 128 on the line 126. The first pulse 170 to be generated by the counter after clear pulse 120 is used by the address transfer circuit 178 to transfer the 4 low order address bits of the ROM 134 from line 133 to the 4 low order bits from the encoding key as read by the key reader 109 and presented on the 8 bit data line 176. At the same time the transfer circuit 178 places the address 1000 on the 4 high order address bits of the ROM 134. Through the lines 135 and 158, the 8 bit ROM word selected by the low order 4 bits of the encoding key is made available to both latches 172 and 174. The latch 172 is at this moment receiving a loading command on the line 170 thus latching the 8 bit ROM word and presenting the 8 data bits on the line 173 for use by the circuitry of FIGS. 12 and 13.

A short time after the trailing edge of pulse 170, the counter 127 generates a short duration pulse on the line 171 which causes a similar address transfer function by the circuit 178 except that the high order 4 bits of the encoding key are presented to the 4 low order bits of the ROM 134 address. The 4 high order bits of the ROM address are now made to be 1001. The 8 bit word from the ROM 134, on the lines 135 and 158, is again presented to both latches 172 and 174. The latch 174, which is presently being enabled by the pulse 171, latches the 8 bit ROM word and presents the 8 data bits on the line 175. It may now be seen that the latches 172 and 174 are loaded after each clear pulse 120 with the same pair of 8 bit data words from the ROM 134. This multiple loading may seem redundant, however, the latches 172 and 174, will loose contents when power is removed from the LIC circuitry, therefore, reloading is arranged as a continuous operation during a period of time when the ROM is free of other activities.

Figure 12:
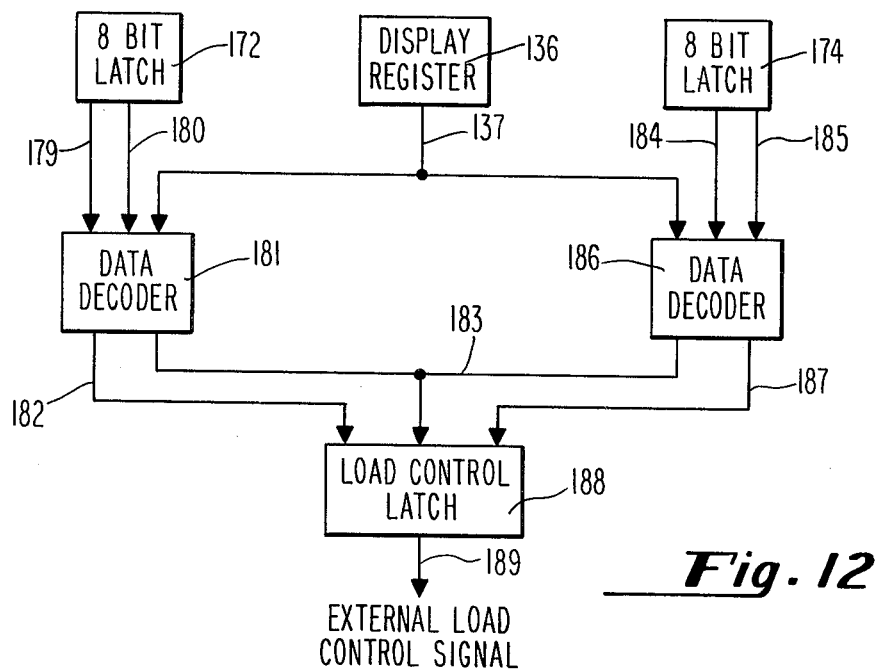
FIG. 12 is a block diagram of a ROM-load control interface.

The control combinations of Table C have been chosen for this embodiment to demonstrate the two basic load control functions of ON and OFF plus at least one of the intermediate functions, in this case 50% of full load. The 50% function is of course only intended for those loads capable of operating at reduced power input, for example, resistance heating elements or air conditioning equipment with dual selectable thermostats which are arranged for normal cooling as determined by a first thermostat when 100% load is permissible and reduced cooling (higher temperature) when a 50% load reduction is requested. Although only one intermediate level has been demonstrated, it should be understood that a number of levels are possible by use of the unassigned spare codes as listed in Table C, and additional load control latches for the additional levels. FIG. 12, is a simplified block diagram of the major elements required to translate the pair of 8 bit ROM data words into a pair of load control combinations for increase and decrease as listed in the Table C.

Figure 13:
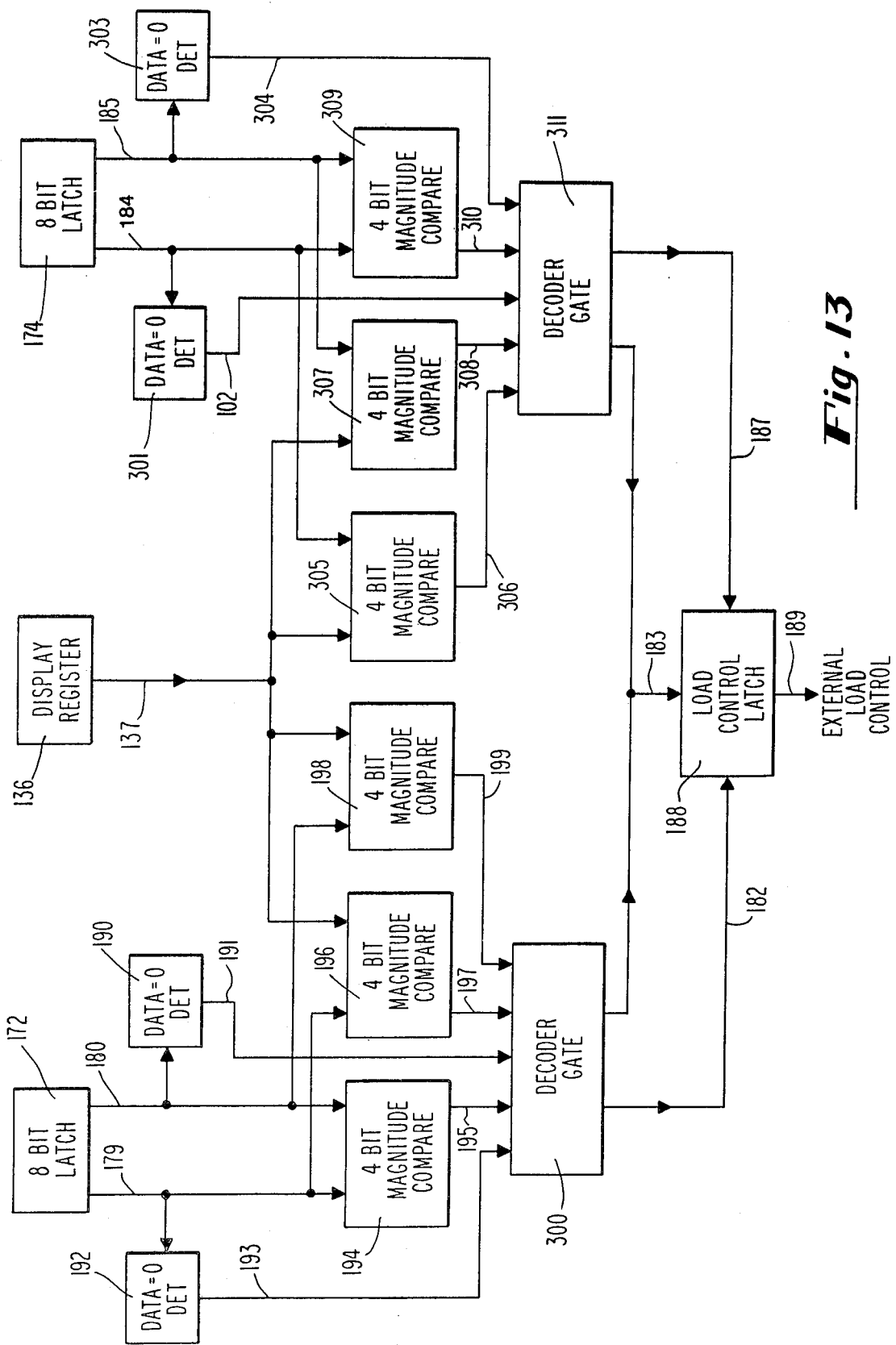
FIG. 13 is a block diagram of the data decoder circuitry.

The latches 172 and 174, as mentioned above, each store one 8 bit word from ROM 134. The latch 174, determines load decrease combinations while the latch 174, determines load increase combinations as a function of display register 136 information. The 8 bit words 173 and 175 of FIG. 11 are each split into a pair of 4 bit words 179-180 and 184-185 respectively in FIG. 12. The data decoder 181 selects two levels of load decrease commands for the load control latch 188. A signal on the line 183 brings the load to the 50% level until another command is received by the latch 188. A signal on the line 182 turns the load OFF until another command is received by latch 188. The data decoder 186 selects two levels of load increase commands for the latch 188. A signal on line 183 increases the load from OFF to a 50% level until another command is received by the latch 188. A signal on line 187 increases the load from 50% to 100% until another command is received by latch 188. The three state latch 188 is connected to external loads by the control line 189, which may include separate control leads for each of the load control levels. FIG. 13 is a more detailed block diagram of the elements within the boxes 181 and 186 of FIG. 12. As above mentioned, the 8 bit data word stored in latch 172 is split into a pair of 4 bit words 179 and 180, which in turn determine the way display register 136 information will alter the state of latch 188, and thus the load itself.

Table D is a listing of the various combinations of the 4 bit words 179-180-137 and 184-185-137 with the resulting load control command:

TABLE D

| 4 BIT WORDS 179,180-184,185 | | DISPLAY REGISTER 4 BIT WORD 137 | EXTERNAL LOAD COMMAND |
|---|---|---|---|
| $179 \neq 0$ | $179 < 180$ | $137 \leq 180$ | OFF |
| $179 \neq 0$ | $179 < 180$ | $179 < 137 < 180$ | 50% |
| $184 > 185$ | $185 \neq 0$ | $184 > 137 > 185$ | 50% |
| $184 > 185$ | $185 \neq 0$ | $137 \leq 185$ | ON |
| $184 \neq 0$ | $185 > 184$ | $184 < 137 < 185$ | ON |
| $184 \neq 0$ | $185 = 184$ | $137 = 185$ | ON |
| $179 = 0$ | $180 \neq 0$ | $137 = 180$ | SPARE |
| $179 = 0$ | $180 \neq 0$ | $137 > 180$ | DECREASE |
| $179 > 180$ | $180 \neq 0$ | $137 = 179$ | CODES |
| $179 > 180$ | $180 \neq 0$ | $137 = 180$ | |
| $179 > 180$ | $180 \neq 0$ | $137 < 180$ | |
| $179 > 180$ | $180 \neq 0$ | $137 > 179$ | |
| $179 \neq 0$ | $180 = 179$ | $137 = 179$ | |
| $179 \neq 0$ | $180 = 179$ | $137 < 179$ | |
| $179 \neq 0$ | $180 = 179$ | $137 > 179$ | |
| $184 = 0$ | $185 \neq 0$ | $137 = 185$ | SPARE |
| $184 = 0$ | $185 \neq 0$ | $137 > 185$ | INCREASE |
| $184 \neq 0$ | $185 = 0$ | $137 = 184$ | CODES |

TABLE D-continued

| 4 BIT WORDS 179,180-184,185 | | DISPLAY REGISTER 4 BIT WORD 137 | EXTERNAL LOAD COMMAND |
|---|---|---|---|
| $184 \neq 0$ | $185 = 0$ | $137 > 185$ | |

The elements 190, 192, 301 and 303 determine if the associated 4 bit data words 179, 180, 184 and 185, respectively are each equal to zero or greater than zero. A 4 bit magnitude comparator 194 determines the magnitude relationship of words 179 and 180, while the comparator 309 determines the relationship of words 184 and 185. The comparator 196 determines the relationship of words 137 and 179, while the comparator 198 determines the relationship of words 137 and 180. The comparator 305 determines the relationship of words 137 and 184, while the comparator 307 determines the relationship of words 137 and 185. The zero detector and comparator outputs are fed to decoder gates within the boxes 300 and 311 which in turn perform the logic listed in the first three columns in Table D. For example when the three conditions listed in the second row are each true, the load will either remain at 50% or will be reduced from 100% to 50%. This condition will be held in the latch 188 as instructed by a signal on the line 183. The control logic of Table D, thus provides for the selection of any pair of control combinations for load decrease and increase as listed in Table C.

It will be appreciated that the circuitry disclosed herein may be coupled to the power line using a variety of techniques other than direct connection as described heretofore. Other applicable coupling techniques include optical, magnetic, static, acoustic or mechanical.

It will also be appreciated that the load control or signaling which results from the circuitry disclosed herein may be used for a variety of purposes. For example, the control signals may be used to limit or inhibit the reapplication of load to the power gird especially after substantial load has been dropped as, for example, after a power black out.

Although specific embodiments of the invention have been shown and described, it will be appreciated that various modifications may be made without departing from the true spirit and and scope of the invention as set forth in the appended claims.

What is claimed is:

1. Apparatus for use in a power generating system wherein power is transmitted at a nominal standard frequency, the frequency is controllably varied from said nominal standard to signal load and/or load control information, and the frequency is also varied without signaling load and/or load control information, said apparatus comprising:
   detector means for detecting variations in frequency signaling load and/or load control information while ignoring other frequency variations; and
   load signal means coupled to said detector means for signaling a detected variation in frequency.

2. The apparatus of claim 1 including programming means coupled to said load signal for programming said load signal means to selectively signal a predetermined variation in frequency thereby signaling predetermined load and/or load control information.

3. The apparatus of claim 2 wherein said programming means is adapted to be irreversibly programmed.

4. The apparatus of claim 1 further comprising:

low voltage sensing means for sensing a low power voltage in said system; and low voltage signaling means coupled to said low voltage sensing means for signaling a low voltage in said system.

5. The apparatus of claim 4 wherein said low voltage signaling means is coupled to said load signaling means to inhibit signaling by said load signaling means.

6. The apparatus of claim 1 including back-up means for said detector means so as to permit said detector to ignore power interruptions.

7. The apparatus of claim 1 herein said detector means further comprises means for detecting a predetermined power frequency in said system.

8. The apparatus of claim 1 wherein said detector means further comprises means for detecting a frequency within a predetermined frequency range.

9. The apparatus of claim 1 wherein said detector means comprises means for detecting a predetermined rate of change of the power frequency in said system.

10. The apparatus of claim 1 wherein said detector means comprises means for detecting a rate of change of frequency within a predetermined range in said system.

11. The apparatus of claim 1 wherein said detector means comprises:
means for detecting a power frequency within a predetermined frequency range;
means for detecting a rate of change of frequency within a predetermined rate range; and
means coupled to said means for detecting a power frequency and said means for detecting rate of change of frequency for validating the frequency within the predetermined frequency range as representing a predetermined load and/or load control signal in response to detecting a frequency having a rate of change within said predetermined rate range.

12. The apparatus of claim 1 wherein said detector means includes means for detecting a power frequency of predetermined duration in said system.

13. The apparatus of claim 1 wherein said detector means includes means for detecting a power frequency of a duration within a predetermined range in said system.

14. The apparatus of claim 1 wherein said detector means comprises:
first means for detecting a frequency within a predetermined frequency range;
second means for detecting a rate of frequency change within a predetermined rate range;
third means for detecting a duration of the power frequency within a predetermined duration range; and
validating means coupled to the first means, second means and third means for validating the frequency within a predetermined frequency range as representing a predetermined load and/or load control signal in response to detecting a power frequency having a rate of change within said predetermined rate range and a duration within said predetermined duration range.

15. The apparatus of claim 1 including means coupled to said system and said detector means for indirectly coupling the power frequency to said dector means.

16. The apparatus of claim 1 wherein said detector means includes control means coupled to said load signaling means for controlling consumption of power.

17. The apparatus of claim 1 wherein said detector means includes memory means identifying predetermined power frequency characteristics for signaling load and/or load control information.

18. A method of operating apparatus located at a power consuming location in a power transmission system wherein power is transmitted at a nominal standard frequency and the frequency is controllably varied from the nominal standard to signal load and/or load control information at certain times and the frequency is also varied without signaling load and/or load control information at other times, the method comprising the following steps:
detecting variations in frequency signaling load and/or control information while ignoring other frequency variations; and
signaling in response to detecting a detected variation an frequency.

19. The method of claim 18 including a step of programming the load signaling to selectively signal a predetermined variation in frequency representing predetermined load and/or load control information.

20. The method of claim 18 further comprising the steps of:
sensing a low power voltage of the system; and
signaling in response to the sensing of a low power voltage of the system.

21. The method of claim 20 wherein load signaling is inhibited in response to low voltage signaling of the system.

22. The method of claim 18 further comprising the step of ignoring interruptions in power in the system.

23. The method of claim 18 wherein the step of detecting comprises detecting a frequency of the system within a predetermined frequency range.

24. The method of claim 18 wherein the step of detecting comprises detecting a predetermined rate of change of the power frequency of the system.

25. The method of claim 18 wherein the step of detecting comprises detecting a rate of change of frequency of the system within a predetermined range.

26. The method of claim 18 wherein the step of detecting comprises:
detecting a power frequency within a predetermined frequency range;
detecting a rate of change of frequency within a predetermined range; and
validating the frequency within the predetermined frequency range as representing a predetermined load and/or load control signal in response to detecting a frequency having a rate in a predetermined frequency range and detecting a predetermined rate of change of frequency as representing a predetermined load and/or load control signal.

27. The method of claim 18 wherein the step of detecting includes detecting a power frequency of the system of predetermined duration.

28. The method of claim 18 wherein the step of detecting includes detecting a power frequency of the system of duration within a predetermined range.

29. The method of claim 18 wherein the step of detecting comprises:
detecting the frequency within a predetermined frequency range;
detecting a rate of frequency change within a predetermined rate range;
detecting a duration of the power frequency within a predetermined duration range; and
validating the frequency within a predetermined frequency range as representing a predetermined load and/or load control signal in response to detecting a power frequency having a rate of change within the predetermined rate range and a duration within the predetermined range.

* * * * *